Oct. 2, 1945.  D. T. STREET  2,386,012

OPHTHALMIC INSTRUMENT

Filed Nov. 6, 1943

DONALD T. STREET
INVENTOR

BY
ATTORNEYS

Patented Oct. 2, 1945

2,386,012

UNITED STATES PATENT OFFICE 2,386,012

OPHTHALMIC INSTRUMENT

Donald T. Street, Rochester, N. Y., assignor to Bausch & Lomb Optical Company, Rochester, N. Y., a corporation of New York Application November 6, 1943, Serial No. 509,246

10 Claims. (Cl. 88—20)

This invention relates to ophthalmic instruments and more particularly to improvements in trial frames.

Trial frames are often employed by oculists and opticians to hold test lenses before the eyes of the patient during an eye examination. As the contours of the face of each patient vary, these frames are generally adjustable so that the test lenses can be disposed in the desired angular position before the eyes of the patient undergoing examination.

It is the general object of this invention to provide means for effecting angular adjustments of the trial frame for the purpose above indicated.

It is another object of this invention to provide an efficient and compact construction of means for this purpose which will facilitate the accurate and quick adjustment of the trial frame with respect to the eyes of the patient.

Other objects and advantages reside in certain novel features of construction, arrangement and combination of parts as will hereinafter be more fully described and pointed out in the appended claims.

Figure 1:
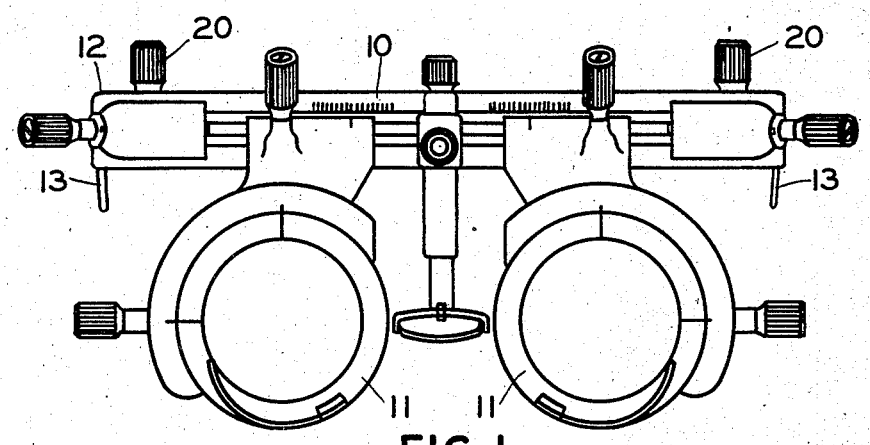
Fig. 1 is a front elevation of a trial frame embodying the invention.
Figure 2:
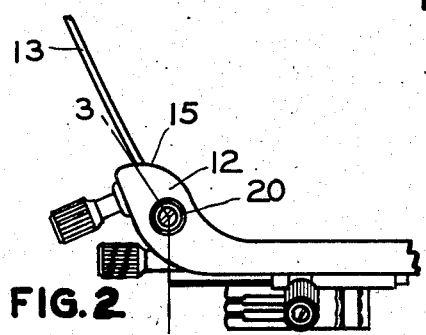
Fig. 2 is a top plan view of a fragmentary portion of the same.

In the drawing, the numeral 10 designates the body of the trial frame from which depend the lens-holders 11, the opposite ends of the body 10 comprising cages 12 in which the ends of the temples 13 are adjustably connected to the body 10.

Figure 3:
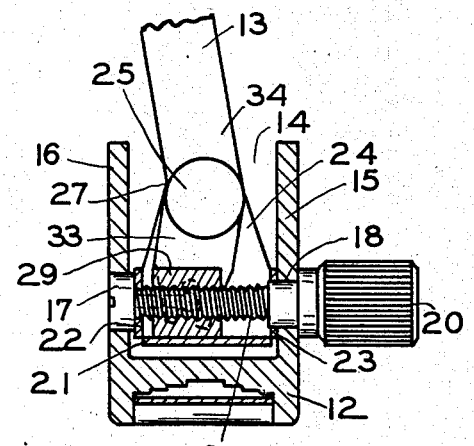
Fig. 3 is an enlarged detail sectional view taken on line 3—3 of Fig. 2.

In the preferred embodiment of the invention, and as shown in Fig. 3, the cages 12 are U-shaped in cross-section to provide an internal groove 14 for receiving the temple-adjusting mechanism.

Each of the horizontal walls 15 and 16, defining the groove 14, have openings therein for receiving and supporting bearing member 17 and 18 carried by the opposite ends of a threaded shaft 19. The one end of the shaft projects beyond the wall 15 and carries a knurled knob 20 for rotating the shaft.

The shaft 19 is held against longitudinal movement to the right, as viewed in Fig. 3, by a casing 21 having a pair of spaced walls 22 and 23 formed with apertures through which the shaft 19 extends. The aperture in the wall adjacent the bearing member 17 has a diameter less than the diameter of the bearing member and thus this wall holds the latter against movement with the shaft. The shaft is held against movement to the left, as viewed in the figure referred to, by the knob 20. The end wall 22 is held against the bearing member 17 by the other end wall 23 engaging the interior surface of the wall 15 of the cage. The casing 21 is freely rotatable about the shaft 19.

Figure 4:
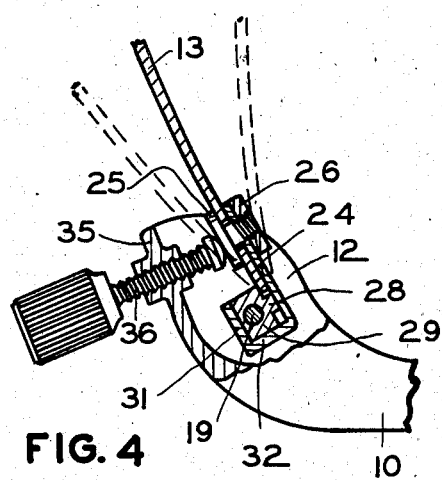
Fig. 4 is a top sectional view somewhat enlarged of a fragmentary portion of the trial frame embodying the invention.
Figure 5:
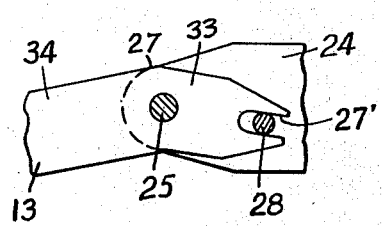
Fig. 5 is a view showing the slotted temple end and cooperating pin.

As shown in Figs. 3 and 4, the temple 13 is pivotally secured to a lug formed by a projecting wall 24 of the casing 21 by means of a screw 25 and a lock nut 26.

For the purpose of angularly adjusting the lens-holders 11 of the trial frame with respect to the eyes of the patient, the lens-holders 11 may be tilted at any desired angle through the relative adjustment between the cages 12 and the temples 13. For effecting this result, the screw 25 serves as a pivot between the cages 12 and the temple 13. As shown in Fig. 3, the temple 13 is offset at the joinder of the temple with the screw 25 to thereby form a bell crank lever 27 having a bifurcate end portion, the slot 27' of which receives a pin 28 integral with a traveling nut 29 threaded on the shaft 19. The walls 24, 31 and 32 of the casing 21 form guides for the nut 29 upon movement of the nut axially of the shaft 19 and prevent rotation of the nut as the shaft is rotated. The wall 24 also serves to maintain the bifurcate end portion of the lever 27 in engagement with the pin 28.

From the foregoing, it will be apparent that upon rotation of the shaft 19 by the knob 20, the nut 29 will be moved longitudinally of the shaft 19. The pin 28 of the nut 29 will cam the lever 27 about its pivot, established by the screw 25, to move the temple 13 in a vertical path relative to the lens-holders 11 of the body 10. In thus effecting movement of the temple, it will be noted that the fulcrum of the lever 27, represented by the pivot screw 25, is disposed almost at the end of the lever. As a result, a small displacement of the short arm 33 of the lever 27 will effect a considerably larger displacement of the longer arm 34 terminating in the ear engaging end of the temple. It is therefore readily apparent that the lens-holders 11 may be tilted quickly and positively to position them relative to the temples 13. This relative movement of the temples and lens-holders will angularly adjust the lens-holders 11 with respect to the eyes to permit the test lenses to occupy the correct angular position relative to the eyes of the patient.

Also, it can be readily seen that as the casing 21 is rotatably mounted on the shaft 19, and the nut 29 will rotate with the casing, the temple may be swung outwardly or inwardly to permit engagement of the temple ear pieces with the head of the patient and also to permit the temples to be folded inwardly upon the frame.

The outer wall 35 of each cage carries an adjustable stop member which may comprise a screw 36 threadedly mounted in the wall and having at the inner end thereof an enlarged head forming a stop to limit pivotal movement of the temples about the shaft 19. The screw 36 also can be used to adjust the temples relative to the shaft 19 to cause the same to snugly engage the head of the patient after the trial frame has been positioned on the head of the patient.

As the temples 13 are easily disengaged from the cages 12 by removing the screw 25, other types of temples may be readily attached to the trial frame by merely engaging the slot 27' in the end of the temple with the pin 28 and aligning the opening in the temple with the tapped opening in the wall 24 of the casing 21 to permit the insertion of the screw 25 within the openings and its retention therein by the lock nut 26.

From the foregoing, it will be apparent that I have provided an improved trial frame having compact and efficient means for quickly and accurately varying the angularity of the frame with respect to the eyes of the patient to thereby permit the test lenses to occupy the desired angular position during the testing of the eyes of the patient.

Various modifications can obviously be made without departing from the spirit of my invention as pointed out in the appended claims.

I claim:

1. In an ophthalmic lens frame, the combination with a body; an elongate member carried at an end of said body; means rotatably mounted on said member; a temple; a pivot for connecting said temple intermediate the ends thereof to said rotatably mounted means whereby said temple may be moved about said elongate member; traveler means carried by said elongate member and movable axially thereof; means on said last-named means interconnecting the same and the one end of said temple for moving said temple about said pivot upon movement of said traveler means axially of said elongate member whereby the temple may be angularly adjusted relative to the body.

2. In an ophthalmic lens frame, the combination with a body; an elongated member carried at one end of said body; means rotatably mounted on said member; a temple; a pivot extending normal to said temple and connecting said temple adjacent an end thereof to said rotatably mounted means whereby said temple may be moved about said elongate member; traveler means carried by said elongate member and movable axially thereof; means on said last-named means interconnecting the same and the end of said temple for moving said temple about said pivot upon movement of said traveler means axially of said elongate member, the arcuate movement of said end about said pivot causing a substantially larger displacement of the other end of said temple.

3. In an ophthalmic lens frame, the combination with a body; a threaded member journaled in an end of said body; means rotatably mounted on said member; a temple; a pivot for connecting said temple adjacent an end thereof to said rotatably mounted means whereby said temple may be moved about said threaded member; a nut threaded on said threaded member and movable axially thereof; means carried by said nut and engageable with the end of said temple for rocking said temple about its pivot upon rotation of said member.

4. In an ophthalmic lens frame, the combination with a body; a threaded member journaled in an end of said body; means rotatably mounted on said member; a lug carried by said means and extending outwardly therefrom; a temple pivotally connected to said lug and having a slot at one end thereof; a nut carried by said threaded member, said nut held against rotation with said member upon rotation of said member and movable axially thereof; a pin carried by said nut and engageable with the slot in said temple for rocking said temple about its pivot upon rotation of said member.

5. In an ophthalmic lens frame, the combination with a body; a threaded member journaled in an end of said body; a casing rotatably mounted on said member; a temple; a pivot extending normal to said temple and connecting said temple adjacent an end thereof to said casing whereby said temple may be moved about said threaded member; a nut carried by said threaded member and movably axially thereof, said nut engaged by said casing and rotatable therewith; means carried by said nut and engageable with the end of said temple for rocking said temple about its pivot upon rotation of said member.

6. In an ophthalmic lens frame, the combination with a body having lens-holders depending therefrom; a threaded member journaled in each end of said body; a casing rotatably mounted on said member; a lug carried by said casing and extending outwardly therefrom; a temple pivotally connected intermediate the ends thereof to said lug, said temple having an offset bifurcate end portion; a nut carried by said threaded member and movable axially thereof; a pin carried by said nut and engaging the bifurcate end of said temple for moving said temple about said pivot upon movement of said nut axially of said threaded member, the pivotal movement of said temple tilting said lens holders to a desired angular position relative to the eyes of a patient.

7. In an ophthalmic lens frame, the combination with a body; a threaded member journaled in an end of said body; a casing rotatably mounted on said member; a lug carried by said casing and extending outwardly therefrom; a temple, said temple comprising a pair of rigidly interconnected angularly disposed levers of different lengths; a pivot connecting said lug with said temple at the juncture of said levers whereby said temple may be moved about said threaded member; a nut carried by said threaded member and movable axially thereof; a pin carried by said nut and engaging the end of one of said levers for moving the same and the other of said levers about said pivot upon movement of said nut axially of said threaded member, a small displacement of one lever causing a substantially larger displacement of the end of the other lever.

8. In an ophthalmic lens frame, the combination with a body; a threaded member journaled in each end of said body; a casing rotatably mounted on said member; a lug carried by said casing and extending outwardly therefrom; a temple, said temple being formed with an angularly extending end portion and forming a bell crank lever; means for pivotally connecting said lug at the juncture of the two arms of said lever whereby said temple may be moved about said threaded member; a nut carried by said threaded member and movable axially thereof; means carried by said nut and engaging the end of one arm of said lever for actuating said other arm of said lever about said pivot, a small displacement of the engaged end of said one arm causing a substantially larger displacement of the end of said other arm.

9. In a trial frame the combination of a body terminating in a U-shaped end portion, a threaded shaft rotatably mounted between the sides of said end portion, a casing rotatably mounted on said shaft and positioned between said sides, a temple mounted on said casing whereby the temple may turn about said shaft, said temple having an offset end portion provided with a slot, said temple being pivotally mounted on said casing by a pivot located adjacent the offset end, a traveling nut carried by said shaft and engaging the threads thereof, a pin carried by said nut and slidably engaging said slot whereby the temple may be adjusted angularly with respect to the body by rotation of said shaft.

10. In a lens carrying frame the combination of a body, an elongate member carried by the body, means mounted to turn about the axis of said member, a temple carried by said means whereby it may move about said axis, said temple being pivotally mounted on said means by pivot means located intermediate the ends of the temple and adjacent one end thereof to provide a short lever arm, actuating means movable along said elongate member and operatively connected to the short lever arm of the temple and means for moving said actuating means whereby the temple may be adjusted angularly relative to said body.

DONALD T. STREET.